Nov. 20, 1928.

B. M. FROMKNECHT 1,692,644

ELECTRIC COOKING UTENSIL

Filed Dec. 2, 1926

INVENTOR.
Bernard M. Fromknecht
BY
ATTORNEYS.

Patented Nov. 20, 1928.

1,692,644

UNITED STATES PATENT OFFICE.

BERNARD M. FROMKNECHT, OF ERIE, PENNSYLVANIA, ASSIGNOR TO THE GRISWOLD MANUFACTURING COMPANY, OF ERIE, PENNSYLVANIA, A CORPORATION OF PENNSYLVANIA.

ELECTRIC COOKING UTENSIL.

Application filed December 2, 1926. Serial No. 152,163.

This invention relates to cooking utensils, particularly such as waffle irons, which are frequently subjected to the action of fats and over-running of materials at the edges of such utensils. Such utensils are usually provided with a heating element arranged under the utensil and it is also desirable to insulate the supporting base of the utensil from the cooking surface so as to conserve the heat of the heating element. The present invention is designed to guard the electric element from the action of any over-running of oils, or materials from the cooking surface. Features and details of the invention will appear from the specification and claims.

The invention is illustrated in the accompanying drawings as follows:—

Figure 1:
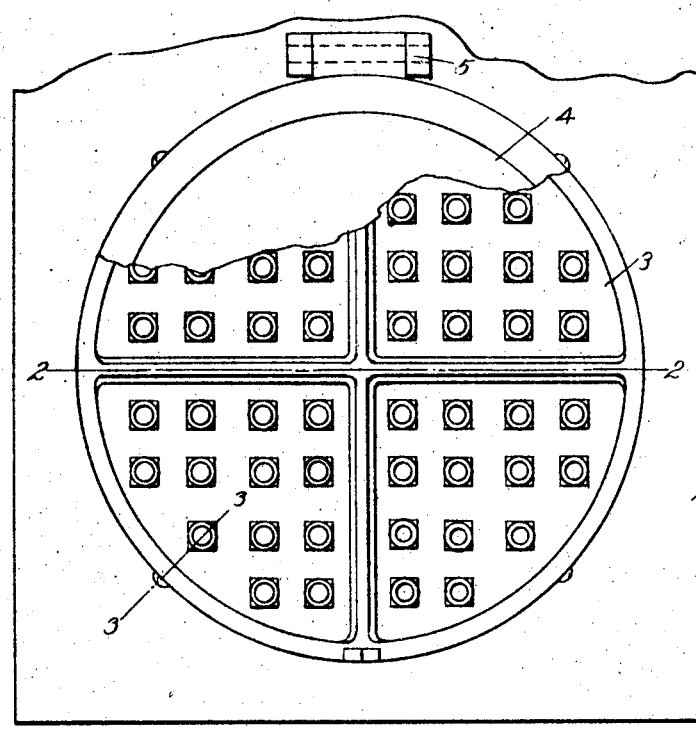
Fig. 1 shows a plan view of a waffle iron, a part being broken away to better show construction.
Figure 2:
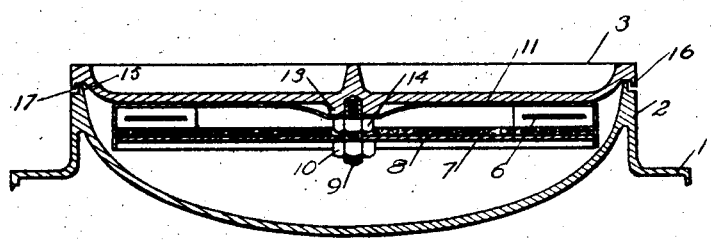
Fig. 2 is a section on the line 2—2 in Fig. 1.
Figure 3:
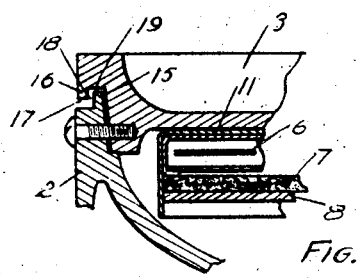

Fig. 3 an enlarged section on the line 3—3 in Fig. 1.

1 marks the supporting base, 2 a wall on the base, 3 a hot plate forming a cooking surface, 4 the upper plate of the waffle iron, and 5 the hinge. These parts may be in general of usual construction.

6, shows a heating element. As shown here it is of annular form. This rests on an asbestos insulating pad 7. The asbestos pad rests on a supporting plate 8 and a stud 9 extends from the hot plate 3 through the supporting plate 8 and a nut 10 on the underside of the plate secures the plate 8.

A guard plate 11 is arranged between the heating element and the hot plate. This has a protecting downwardly extending skirt which will prevent any drip, or over-run from the plate reaching the heating element. The guard plate is clamped against a boss 13 on the underside of the plate 3 by a nut 14. The nut 14 clamps the plate sufficiently tight on the boss to prevent any leakage reaching the interior of the space between the plates 8 and 11.

In order to insulate the hot plate from the base I provide a slight air gap between the base and the plate. The wall 2 has an upwardly extending rib 15 and the plate the downwardly extending lip 16 overlapping the rib 15. An air gap is formed by an inwardly extending space 17 at the bottom of the lip 16, an upwardly extending space 18 between the rib and lip and a space 19 between the plate and the upper edge of the rib 15. The spaces 17 and 18 are of a dimension which will not form a capillary passage through which the material will be carried up to the top of the rib 15. On the other hand the space 19 in order to prevent any material heat losses from the element is comparatively slight and may be within the dimensions of what is ordinarily known as a capillary passage. Thus the carrying in of oils through the air gap through capillary action is prevented by reason of the enlarged openings 17 and 18 and while the air gap 19 is sufficient to very largely prevent heat transfer from the cooking plate to the base it is sufficiently restricted to prevent any material heat losses by reason of air circulation.

What I claim as new is:—

1. In an electric cooking utensil, the combination of a hot plate having a cooking surface thereon; a heating element secured under the plate; and a guard plate clamped at its center to the underside of the hot plate and having a depending drip protecting skirt at its edge.

2. In an electric cooking utensil, the combination of a supporting base, a hot plate having a cooking surface on the base, said hot plate having a depending lip overlapping the upper edge of the supporting base with an air gap between the lip and the edge of the base, the gap being wider at its outer part than the inner part of the gap; and an electric element arranged under the hot plate.

3. In an electric cooking utensil, the combination of a supporting base; a hot plate having a cooking surface on the base, said hot plate having a depending lip overlapping the upper edge of the supporting base with an air gap between the lip and the edge of the base, the gap being wider at its outer part than the inner part of the gap, the outer part having a dimension greater than a capillary passage; and an electric element arranged under the hot plate.

4. In an electric cooking utensil, the combination of a supporting base; a hot plate having a cooking surface on the base, said hot plate having a depending lip overlapping the upper edge of the supporting base with an air gap between the lip and the edge of the base, the gap being wider at its outer part than the inner part of the gap, the outer part having a dimension greater than a capillary passage and the inner part having a dimension forming a capillary passage; and an electric element arranged under the hot plate.

5. In an electric cooking utensil, the combination of a supporting base; a hot plate arranged on the base with an insulating space between the base and plate; a heating element secured under the hot plate; and a guard plate arranged between the heating element and the hot plate, said guard plate having a depending drip protecting skirt.

In testimony whereof I have hereunto set my hand.

BERNARD M. FROMKNECHT.